United States Patent
Kodama

(10) Patent No.: US 8,970,716 B2
(45) Date of Patent: Mar. 3, 2015

(54) IMAGE-CAPTURING APPARATUS AND CONTROL METHOD OF THE IMAGE-CAPTURING APPARATUS

(75) Inventor: Yasunobu Kodama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 13/349,259

(22) Filed: Jan. 12, 2012

(65) Prior Publication Data

US 2012/0194689 A1 Aug. 2, 2012

(30) Foreign Application Priority Data

Jan. 28, 2011 (JP) ................................. 2011-017114

(51) Int. Cl.
*H04N 5/225* (2006.01)
*H04N 5/235* (2006.01)
*H04N 5/243* (2006.01)

(52) U.S. Cl.
CPC ........... *H04N 5/2351* (2013.01); *H04N 5/2352* (2013.01); *H04N 5/2357* (2013.01); *H04N 5/243* (2013.01)
USPC .................................................... 348/220.1

(58) Field of Classification Search
CPC .. H04N 5/2357; H04N 5/23245; H04N 5/232
USPC .................................................... 348/220.1
See application file for complete search history.

(56) References Cited

U.S. PATENT DOCUMENTS

| | | | | |
|---|---|---|---|---|
| 6,157,406 A * | 12/2000 | Iura et al. | ................. | 348/220.1 |
| 6,292,218 B1 * | 9/2001 | Parulski et al. | ............ | 348/220.1 |
| 2009/0174788 A1 * | 7/2009 | Ise | ............... | 348/222.1 |
| 2010/0265313 A1 * | 10/2010 | Liu et al. | ......................... | 348/36 |
| 2012/0154639 A1 * | 6/2012 | Fisher et al. | .................. | 348/239 |

FOREIGN PATENT DOCUMENTS

| | | |
|---|---|---|
| JP | 09-083945 | 3/1997 |
| JP | 2005-260733 A | 9/2005 |
| JP | 2007-251611 A | 9/2007 |
| JP | 2007-306496 A | 11/2007 |
| JP | 2010-114674 A | 5/2010 |
| JP | 2010-262173 A | 11/2010 |

OTHER PUBLICATIONS

The above references were cited in a Nov. 17, 2014 Japanese Office Action, a copy of which is enclosed without an English Translation, that issued in Japanese Patent Application No. 2011-017114.

* cited by examiner

*Primary Examiner* — James Hannett
(74) *Attorney, Agent, or Firm* — Cowan, Liebowitz & Latman, P.C.

(57) ABSTRACT

Suppression of a flicker and appreciated AF accuracy are both taken into account in a program diagram for AF for determining shooting conditions for capturing an image for executing an auto-focus detection process in a moving image/still image continuous shooting mode for recording a still image and moving images of a predetermined period just before the still image capturing. Specifically, in a sector of low luminance in which ISO sensitivity is not a minimum value, a shutter speed that can suppress the flicker is set, and then the ISO sensitivity is reduced to the minimum value to allow obtaining a moving image with the suppression of the flicker.

7 Claims, 5 Drawing Sheets

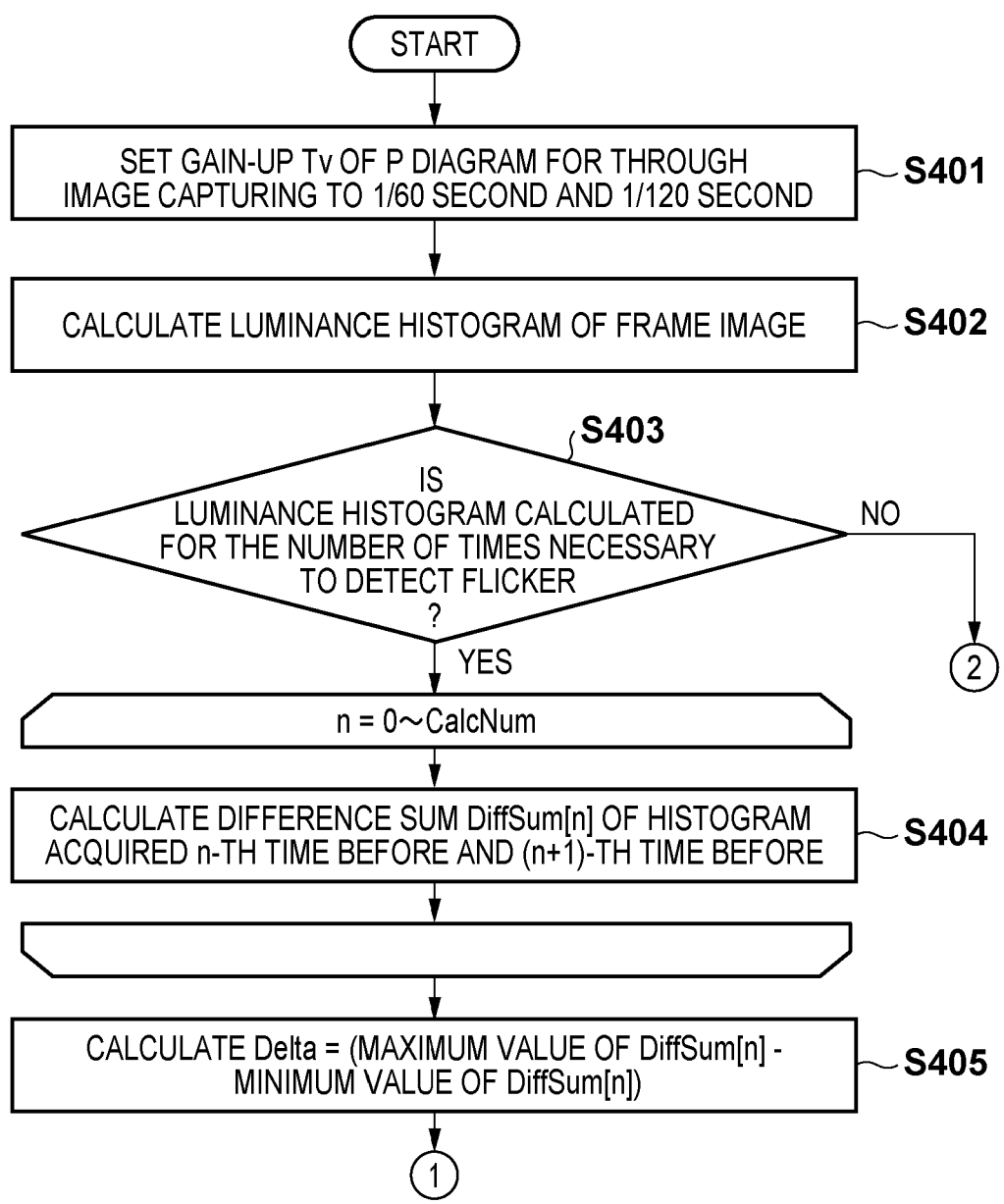

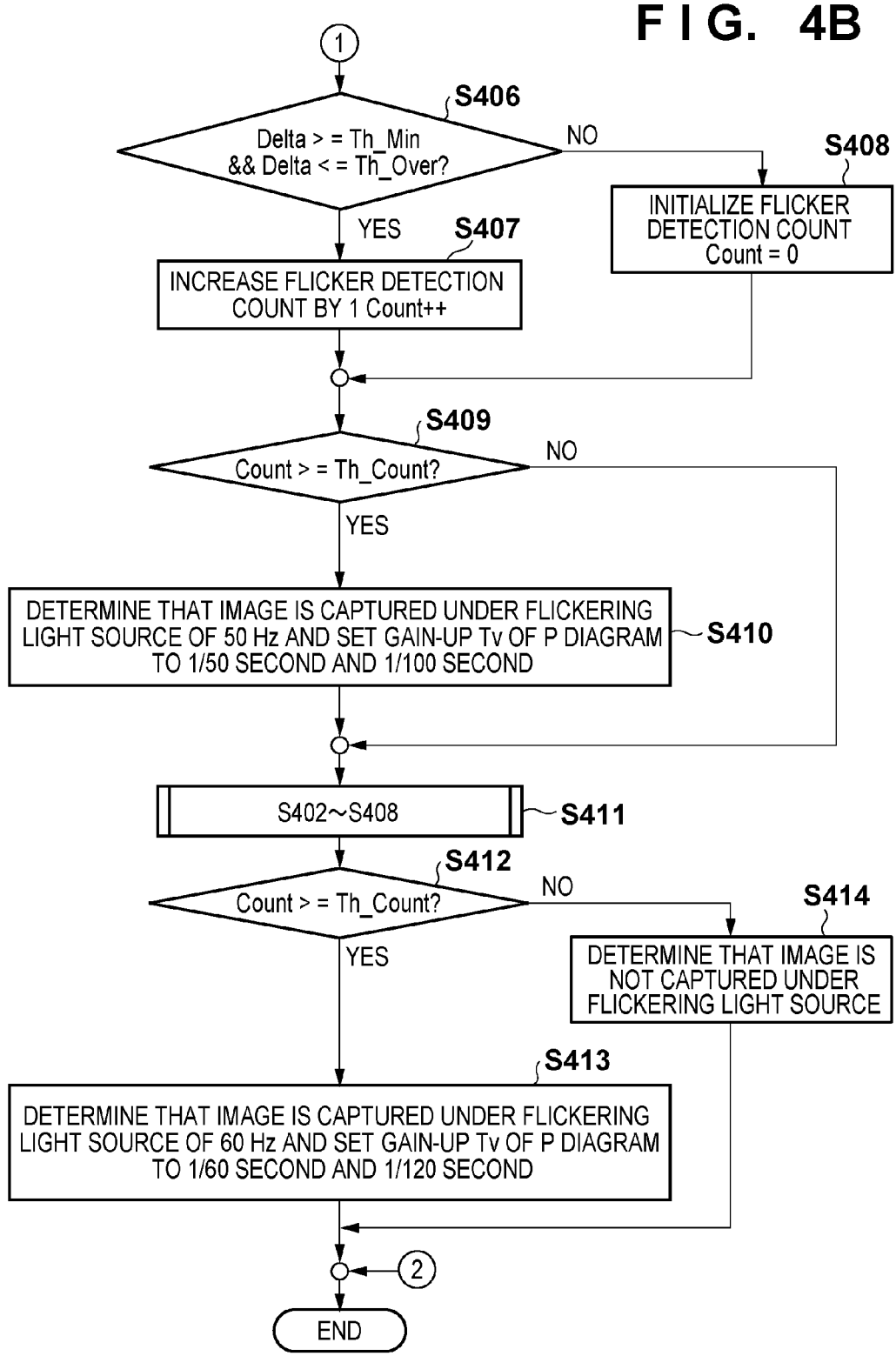

IMAGE-CAPTURING APPARATUS AND CONTROL METHOD OF THE IMAGE-CAPTURING APPARATUS

BACKGROUND OF THE INVENTION

1. Field of the Invention

The present invention relates to an image-capturing apparatus and a control method of the image-capturing apparatus, and particularly, to an image-capturing apparatus and a control method of the image-capturing apparatus that can suppress a flicker generated in a captured image signal.

2. Description of the Related Art

Unlike in a CCD image sensor, the exposure timing is different in each line in a CMOS image sensor used as an image sensor of an image-capturing apparatus such as a digital camera. Therefore, a horizontally striped contrast change is generated in an image signal of one frame captured under a light source (flickering light source), such as fluorescent light, in which the luminance periodically changes according to a power frequency (such as 50 Hz and 60 Hz). Specifically, the luminance of the light source changes at a $1/100$ second period when the power frequency is 50 Hz, and the luminance of the light source changes at a $1/120$ second period when the power frequency is 60 Hz. The contrast change moves with time in the perpendicular direction relative to the exposure lines of the image sensor. The periodical contrast in the perpendicular direction will be called a flicker. To suppress the flicker, there is a known method of capturing an image at a shutter speed of a positive multiple of the period of the luminance change of the light source. More specifically, the shutter speed of the image-capturing apparatus is set to $1/50$ second or $1/100$ second if the power frequency is 50 Hz, and the shutter speed is set to $1/60$ second or $1/120$ second if the power frequency is 60 Hz. Hereinafter, 1/(period of luminance change of light source) will be called a flicker rate.

Meanwhile, in a still image shooting mode of the image-capturing apparatus, a display device displays through images (or live view images) in a standby state, and the display device often functions as an electronic view finder (EVF). A release SW1 that is turned on during half-press of the shutter button and a release SW2 that is turned on during full-press are often arranged on the image-capturing apparatus. A shooting-preparation operation starts when the release SW1 is turned on, and an image-capturing operation starts when the release SW2 is turned on. The shooting-preparation operation includes an auto-focus detection (hereinafter, called "auto focus" or "AF") process, and the image-capturing operation includes an image-capturing process and a saving process of a captured image to a recording medium.

A typical image-capturing apparatus has an automatic exposure control function using program diagrams that define in advance combinations of appropriate shooting conditions (aperture and shutter speed (and ISO sensitivity as necessary) according to the subject luminance. It is known that the program diagrams are prepared according to the usage, and the program diagrams are selectively used.

For example, Japanese Patent Laid-Open No. 9-083945 discloses a video camera that uses different program diagrams in a moving image mode and a still image mode. Specifically, a program diagram that changes the aperture and the gain (ISO sensitivity) to maintain the shutter speed of $1/60$ second is used in the moving image mode. In the still image mode, a program diagram is used in which the shutter speed is set greater than that in the moving image mode, and the shutter speed is set to $1/100$ second in a range of the subject luminance equivalent to indoor brightness to allow suppressing the flicker.

In a conventional image-capturing apparatus such as a digital camera, the aperture is controlled to prevent the aperture in still image capturing from opening wider than the aperture in AF processing in order to capture a still image of a focused subject. This is to prevent the subject focused by the AF processing from being out of focus by opening the aperture in the still image capturing, because the depth of field is shallower when the aperture is opened wider. Therefore, for example, the program diagram used in the AF processing that starts after the release SW1 is turned on is different from the program diagram used when the release SW1 is turned off in order to prevent the aperture in the still image capturing from opening wider than the aperture in the AF processing.

However, assuming a still image shooting mode for recording a moving image in a predetermined period just before the release SW2 is turned on in addition to a still image captured when the release SW2 is turned on, the following problem may occur.

In the still image shooting mode, a moving image captured in a period when the release SW2 is off and the release SW1 is on are recorded, and a shooting-preparation process including the AF processing is executed in the period when the release SW1 is on. As described, the shutter speed that can suppress the flicker may not be set when the program diagram suitable for the AF processing is used in the AF processing. The flicker is included in the moving image captured in the AF processing, and unsuitable images are recorded as the moving image.

SUMMARY OF THE INVENTION

The present invention provides an image-capturing apparatus and a control method of the image-capturing apparatus that solve the problem of the conventional technique. More specifically, the present invention provides an image-capturing apparatus and a control method of the image-capturing apparatus that attain both the suppression of a flicker in a recorded moving image and excellent focus detection accuracy in still image capturing when the moving image of a predetermined period just before the still image capturing are recorded along with the still image.

According to one aspect of the present invention, there is provided an image-capturing apparatus comprising: an image sensor; and a processing unit configured to execute a shooting-preparation process including an auto-focus detection process using image data obtained by capturing by the image sensor in response to a start instruction of the shooting-preparation process, the image-capturing apparatus having a shooting mode for recording a still image obtained by capturing by the image sensor in response to an image-capturing instruction provided after the start of the shooting-preparation process and a moving image obtained by capturing by the image sensor in a predetermined period just before the image-capturing instruction, wherein the processing unit uses a program diagram defining a combination of a shutter speed, an aperture value, and ISO sensitivity for each subject luminance to determine shooting conditions for the image sensor to capture and obtain image data used in the auto-focus detection process in the shooting-preparation process in the shooting mode, the program diagram comprises first to fourth sectors, and the shooting conditions are determined so that in the first sector, the shutter speed is increased to a predetermined shutter speed that can suppress a flicker caused by a light source in an imaging environment while maintaining a full open aperture and maximum ISO sensitivity with an increase in the subject luminance from a combination of the full open aperture, a lowest shutter speed, and the maximum ISO sensitivity, in the second sector next to the first sector, the ISO sensitivity is reduced to minimum ISO sensitivity while maintaining the full open aperture and the predetermined shutter speed with an increase in the subject luminance, in the third sector next to the second sector, the shutter speed is increased to a highest shutter speed while maintaining the full open aperture and the minimum ISO sensitivity with an increase in the subject luminance, and in the fourth sector next to the third sector, the shutter speed is increased from the shutter speed corresponding to the aperture and the minimum ISO sensitivity to the highest shutter speed while maintaining the aperture and the minimum ISO sensitivity with a reduction in the aperture and an increase in the subject luminance from a combination of the minimum ISO sensitivity, the full open aperture, and the highest shutter speed.

According to another aspect of the present invention, there is provided an image-capturing apparatus including a first shooting mode for capturing a still image in response to an image-capturing instruction and recording a moving image of a predetermined period before capturing the still image in response to the image-capturing instruction, wherein when a focus control is performed in response to a start instruction of a shooting-preparation process executed before the image-capturing instruction in the first shooting mode, an exposure control is performed in which a predetermined shutter speed that can suppress a flicker and an aperture value not less than an aperture value to be used for capturing a still image are prioritized.

According to further aspect of the present invention, there is provided a control method of an image-capturing apparatus, the image-capturing apparatus comprising: an image sensor; and a processing unit configured to execute a shooting-preparation process including an auto-focus detection process using image data obtained by capturing by the image sensor in response to a start instruction of the shooting-preparation process, the image-capturing apparatus having a shooting mode for recording a still image obtained by capturing by the image sensor in response to an image-capturing instruction provided after the start of the shooting-preparation process and a moving image obtained by capturing by the image sensor in a predetermined period just before the image-capturing instruction, the method comprising a step, by the processing unit, of using a program diagram defining a combination of a shutter speed, an aperture value, and ISO sensitivity for each subject luminance to determine shooting conditions for the image sensor to capture and obtain image data used in the auto-focus detection process in the shooting-preparation process in the shooting mode, wherein the program diagram comprises first to fourth sectors, and the shooting conditions are determined so that in the first sector, the shutter speed is increased to a predetermined shutter speed that can suppress a flicker caused by a light source in an imaging environment while maintaining a full open aperture and maximum ISO sensitivity with an increase in the subject luminance from a combination of the full open aperture, a lowest shutter speed, and the maximum ISO sensitivity, in the second sector next to the first sector, the ISO sensitivity is reduced to minimum ISO sensitivity while maintaining the full open aperture and the predetermined shutter speed with an increase in the subject luminance, in the third sector next to the second sector, the shutter speed is increased to a highest shutter speed while maintaining the full open aperture and the minimum ISO sensitivity with an increase in the subject luminance, and in the fourth sector next to the third sector, the shutter speed is increased from the shutter speed corresponding to the aperture and the minimum ISO sensitivity to the highest shutter speed while maintaining the aperture and the minimum ISO sensitivity with a reduction in the aperture and an increase in the subject luminance from a combination of the minimum ISO sensitivity, the full open aperture, and the highest shutter speed.

According to yet further aspect of the present invention, there is provided a control method of an image-capturing apparatus including a first shooting mode for capturing a still image in response to an image-capturing instruction and recording a moving image of a predetermined period before capturing the still image in response to the image-capturing instruction, wherein when a focus control is performed in response to a start instruction of a shooting-preparation process executed before the image-capturing instruction in the first shooting mode, an exposure control is performed in which a predetermined shutter speed that can suppress a flicker and an aperture value not less than an aperture value to be used for capturing a still image are prioritized.

Further features of the present invention will become apparent from the following description of exemplary embodiments with reference to the attached drawings.

BRIEF DESCRIPTION OF THE DRAWINGS

FIGS. 4A and 4B are flow charts for describing a specific example of a flicker detection process in S201 of FIG. 2.

DESCRIPTION OF THE EMBODIMENTS

Exemplary embodiments of the present invention will now be described in detail in accordance with the accompanying drawings.

The embodiments in which the present invention is applied to a digital camera as an example of an image-capturing apparatus will be described here. However, the present invention can be applied to an arbitrary image-capturing apparatus that can record a moving image in a predetermined period just before still image capturing along with a still image and that executes an auto-focus detection process during recording of the moving image.

(Configuration of Digital Camera 100)

Figure 1:
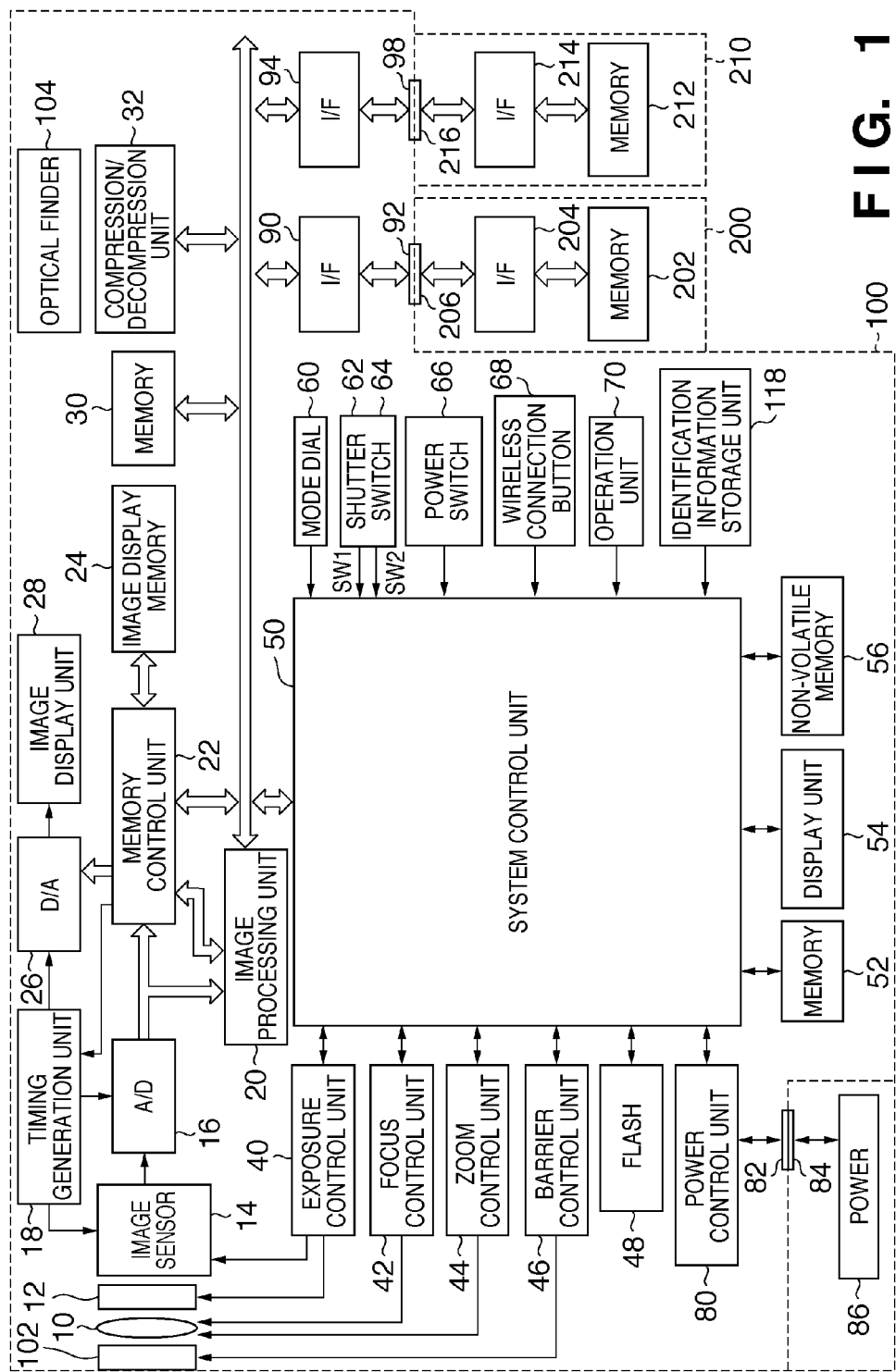
FIG. 1 is a block diagram showing an example of configuration of a digital camera as an example of an image-capturing apparatus according to embodiments of the present invention.

FIG. 1 is a block diagram showing an example of configuration of a digital camera 100 as an example of the image-capturing apparatus according to an embodiment of the present invention. Reference numeral 10 denotes a lens unit, reference numeral 12 denotes a shutter with an aperture function, reference numeral 14 denotes an image sensor that converts an optical image to an electrical signal, and reference numeral 16 denotes an A/D converter that digitizes an analog image signal from the image sensor 14 to convert the signal to image data. A CCD image sensor, a CMOS image sensor, etc., can be used as the image sensor 14. An amplifier not shown is arranged on an output stage of the image sensor 14, and the amplifier amplifies an output signal (analog image signal) of the image sensor 14 by a set gain. An exposure control unit 40 provides a value of the gain.

A timing generation unit 18 supplies a clock signal and a control signal to the image sensor 14, the A/D converter 16, and a D/A converter 26. A memory control unit 22 and a system control unit 50 controls the timing generation unit 18.

An image processing unit 20 applies predetermined pixel interpolation process and color conversion process to image data from the A/D converter 16 or image data from the memory control unit 22.

The image processing unit 20 also uses captured image data to execute a predetermined computation process. The system control unit 50 controls the exposure control unit 40 and a focus control unit 42 based on an obtained computation result to realize AF (auto-focus detection), AE (automatic exposure), and EF (flash pre-flash) functions of a TTL (through the lens) system.

The image processing unit 20 further executes a predetermined computation process using captured image data and executes AWB (auto white balance) processing of the TTL system based on an obtained computation result.

The memory control unit 22 controls the A/D converter 16, the timing generation unit 18, the image processing unit 20, an image display memory 24, the D/A converter 26, a memory 30, and a compression/decompression unit 32.

Output data of the A/D converter 16 is written in the image display memory 24 or the memory 30 through the image processing unit 20 and the memory control unit 22 or directly through the memory control unit 22.

An image display unit 28, such as an LCD and an organic EL display, displays the image data for display written in the image display memory 24 through the D/A converter 26. An electronic view finder (EVF) function can be realized by sequentially displaying the captured image data on the image display unit 28.

The memory 30 is a storage device that stores captured still images and moving images. The memory 30 can also be used as a working area of the system control unit 50.

The compression/decompression unit 32 reads image data stored in the memory 30, compresses the image data according to a predetermined image compression method, and writes the compressed image data in the memory 30. The compression/decompression unit 32 can also read the compression image data from the memory 30, decompress the image data, and write the decompressed image data in the memory 30.

The exposure control unit 40 controls the shutter 12 with an aperture function and has a flash light control function in conjunction with a flash 48. The exposure control unit 40 also sets a gain calculated from a standard gain and a gain coefficient to the amplifier of the image sensor 14.

The focus control unit 42 controls focusing of the lens unit 10, and a zoom control unit 44 controls zooming of the lens unit 10. A barrier control unit 46 controls an operation of a barrier 102 for protecting the lens unit 10.

The flash 48 functions as a fill light source during image capturing and also has a light control function. The flash 48 also has a floodlight function of AF fill light.

The exposure control unit 40 and the focus control unit 42 are controlled using the TTL system. The system control unit 50 controls the exposure control unit 40 and the focus control unit 42 based on the computation result computed by the image processing unit 20 from the captured image data.

The system control unit 50 is, for example, a CPU, and the system control unit 50 executes programs stored in a memory 52 to control the entire digital camera 100. The memory 52 stores constants, variables, programs, etc., for operation of the system control unit 50.

A display unit 54 comprises a combination of output devices, such as an LCD, an LED, and a speaker, and uses texts, images, sounds, etc., according to the execution of a program by the system control unit 50 to output an operation state, a message, etc. One or a plurality of display units 54 are arranged at positions that can be easily viewed near an operation unit 70 of the digital camera 100. Part of the display units 54 is arranged in an optical finder 104.

A non-volatile memory 56 is a memory that can be electrically deleted and recorded, and for example, an EEPROM is used.

A mode dial 60, a first shutter switch (SW1) 62, a second shutter switch (SW2) 64, a power switch 66, a wireless connection button 68, and the operation unit 70 are operation members for instructing the system control unit 50 for the start, end, etc., of predetermined operations. The operation members comprise buttons, switches, dials, touch panels, sight line detection apparatuses, and sound recognition apparatuses or combinations of the components.

The first shutter switch (SW1) 62 is turned on by a first stroke (for example, half-press) of a shutter button (not shown) arranged on the digital camera 100. The activation of the first shutter switch (SW1) 62 is recognized as a start instruction of a shooting-preparation process, and in response, AF processing, AE processing, AWB processing, EF processing, etc., are started.

The second shutter switch (SW2) 64 is turned on by a second stroke (for example, full-press) of the shutter button arranged on the digital camera 100 to instruct the start of a series of processes including an exposure process, a development process, and a recording process. In the exposure process, image data of a signal read out from the image sensor 14 is written in the memory 30 through the A/D converter 16 and the memory control unit 22, and the development process is further executed using the computation by the image processing unit 20 or the memory control unit 22. The recording process is further executed in which the image data is read out from the memory 30, the compression/decompression unit 32 compresses the image data, and the image data is written in a memory card 200 or 210.

The power switch 66 is a switch for turning on and off the power of the digital camera 100.

The wireless connection button 68 is a button for the user to instruct the start of wireless connection for wireless communication by a wireless communication unit 114 between the digital camera 100 and an external apparatus (not shown). If the wireless connection button 68 is pressed when the wireless connection is not established, a wireless connection start instruction is input to the system control unit 50. A personal computer, a printer, a storage server, etc., can be used as the external apparatus that wirelessly communicates with the digital camera 100.

The operation unit 70 is a user interface including operation members such as a switch, a button, a rotational dial switch, and a touch panel.

A power control unit 80 comprises a battery detection circuit, a DC-DC converter, a switch circuit that switches a block to be energized, etc., and detects whether the battery is installed, the type of the battery, and the remaining amount of the battery. The power control unit 80 controls the DC-DC converter based on results of the detection and an instruction of the system control unit 50 and supplies required voltages to the components including the memory cards 200 and 210 for required periods.

A power 86 includes a primary battery, such as an alkaline battery and a lithium battery, a secondary battery, such as a NiCd battery, a NiMH battery, and a Li battery, or an AC adapter, and the power 86 is attached to the digital camera 100 through connectors 82 and 84.

The memory cards 200 and 210 are removable storage media. Not only semiconductor memory cards, but also removable HDDs, etc., can be used as the memory cards 200 and 210. The memory card 200 includes a memory 202, a camera interface 204, and a connector 206. The memory card 210 includes a memory 212, a camera interface 214, and a connector 216. The memories 202 and 212 are non-volatile random access memories. The camera interface 204 can communication with a card interface 90 of the digital camera 100, and the camera interface 214 can communicate with a card interface 94 of the digital camera 100. The connector 206 can be connected to a connector 92 of the camera, and the connector 216 can be connected to a connector 98 of the camera. A card detection unit (not shown) included in the digital camera 100 detects the attachment and the removal of the memory cards 200 and 210.

The barrier 102 covers the image-capturing unit including the digital camera 100 and the lens unit 10 to prevent stain or damage of the image-capturing unit.

The optical finder 104 is, for example, a TTL finder, and a prism and a mirror are used to image a light beam through the lens unit 10. The use of the optical finder 104 allows capturing an image without using an electronic funder function of the image display unit 28.

A wired communication unit 110 performs communication based on RS232C, USB, IEEE1394, P1284, SCSI, modem, LAN, etc. A connector 112 is a connector for connecting a cable when the wired communication unit 110 performs communication between the digital camera 100 and the external apparatus.

The wireless communication unit 114 performs communication based on wireless LAN communication of IEEE802.11a/b/g, etc., Bluetooth, IrDA, etc. An antenna 116 is used for the communication between the digital camera 100 and the external apparatus by the wireless communication unit 114.

An identification information storage unit 118 stores various identification information for authentication before communication when wireless communication with the external apparatus (not shown) is performed through the wireless communication unit 114 and the antenna 116. The identification information storage unit 118 comprises, for example, a rewritable non-volatile memory.

Setting of a program diagram showing a relationship between an aperture value and a shutter speed (and ISO sensitivity and gain) will be described. For example, the system control unit 50 selects one of a plurality of program diagrams stored in the non-volatile memory 56 to set shooting conditions in accordance with the shooting mode set from the operation unit 70. Hereinafter, the program diagram used for image capturing in the auto-focus detection process will be called a P diagram for AF. A shooting mode for recording only a still image obtained by capturing according to an image-capturing instruction will be called a still image shooting mode, and a shooting mode for recording the still image obtained by capturing according to the image-capturing instruction and a moving image of a predetermined period just before the still image capturing will be called a moving image/still image continuous shooting mode. In the present embodiment, a P diagram for AF for the still image shooting mode and a P diagram for AF for the moving image/still image continuous shooting mode are stored in the non-volatile memory 56.

The digital camera 100 of the present embodiment captures a moving image in a standby state that allows capturing a still image and immediately displays the captured moving image on the image display unit 28 to cause the image display unit 28 to function as an electronic view finder. The moving image displayed to cause the image display unit 28 to function as the electronic view finder will be called through images or EVF images.

When the user half-presses the shutter button (not shown) in the standby state to turn on the first shutter switch (SW1) 62, the system control unit 50 starts the shooting-preparation process. The system control unit 50 calculates subject luminance based on, for example, luminance information of the through images. An external measuring sensor with a different optical axis from the lens unit 10 may be used to acquire the subject luminance. The set P diagram for AF is referenced based on the subject luminance to determine the shooting conditions (aperture value and shutter speed (also gain coefficient if necessary). The system control unit 50 supplies the determined shooting conditions to the exposure control unit 40 to control the shutter 12 (aperture value and shutter speed) and the image sensor 14 (ISO sensitivity or gain).

The system control unit 50 starts the auto-focus detection process by, for example, a contrast method based on the captured image data. If the moving image/still image continuous shooting mode is set, the digital camera of the present embodiment accumulates, for example in the memory 52, the latest through images longer than the time set as the length of the moving image recorded with the still image.

When an image-capturing instruction (ON of the second shutter switch (SW2) 64) is provided after the start of the shooting-preparation process, the system control unit 50 starts the series of image-capturing processes including the exposure process, the development process, and the recording process. The system control unit 50 also records the moving image that is temporarily accumulated in the memory 52 and that is obtained by capturing in the predetermined period just before the still image capturing.

<Switching of P Diagram for AF>

Figure 2:
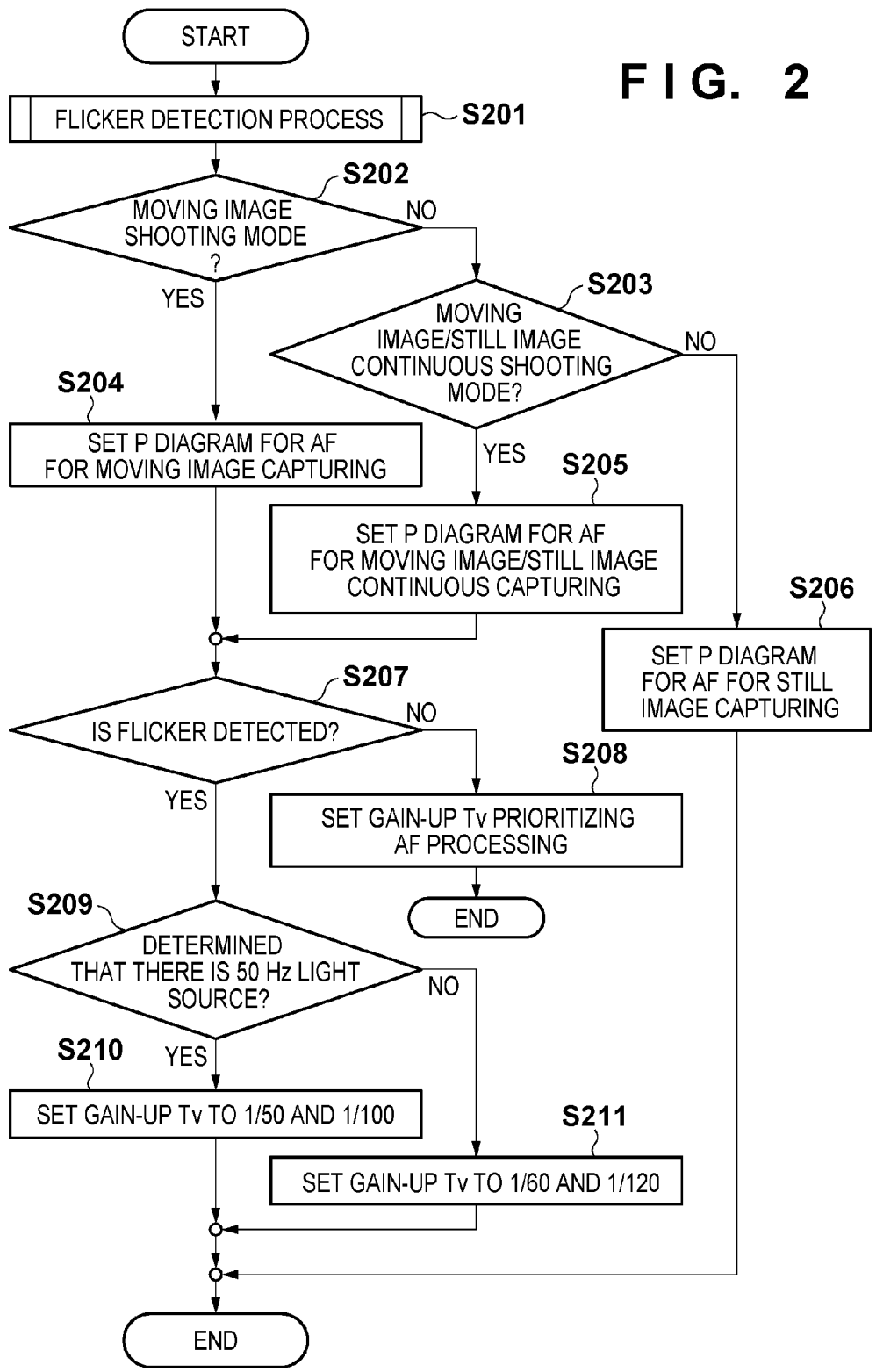
FIG. 2 is a flow chart for describing a program diagram setting operation for an auto-focus detection process in the digital camera according to the embodiments of the present invention.

A switching process of the P diagram for AF in the digital camera 100 according to the present embodiment will be described with reference to a flow chart shown in FIG. 2.

(S201)

The system control unit 50 uses the image processing unit 20 to perform flicker detection for determining whether the through images include a flicker component. Through the flicker detection process, the system control unit 50 determines under which environment the images are captured: under a flickering light source of 50 Hz power frequency; under a flickering light source of 60 Hz power frequency; or under a light source without a flicker. Details of the flicker detection process will be described later with reference to FIGS. 4A and 4B.

(S202 and S203)

The system control unit 50 moves the process to S204 if the shooting mode currently set to the digital camera 100 is the moving image shooting mode, to S205 if the shooting mode is the moving image/still image continuous shooting mode, and to S206 if the shooting mode is another shooting mode (still image shooting mode).

(S204 to S206)

The system control unit 50 reads out the P diagram for AF according to the currently set shooting mode among the P diagrams for AF stored, for example, in the non-volatile memory 56 to set the P diagram for AF to the exposure control unit 40. More specifically, the P diagram for AF for moving image capturing is set in the moving image shooting mode, the P diagram for AF for moving image/still image continuous capturing is set in the moving image/still image continuous shooting mode, and the P diagram for AF for still image capturing is set in the still image shooting mode.

Specific examples of the P diagram for AF for moving image/still image continuous capturing will be described later with reference to FIGS. 3A to 3E. Combinations of the aperture value, the shutter speed, and the gain are defined for each subject luminance based on the following.

Use an aperture as fully open as possible.
Prevent an increase in the gain as much as possible.
Fix the value of the shutter speed to a positive multiple of a reciprocal of the flicker rate when the gain is changed.

(S207)

The system control unit 50 determines whether a flicker is detected in the flicker detection process of S201 and moves the process to S208 if the flicker is not detected and to S209 if the flicker is detected.

(S208)

The system control unit 50 sets a value prioritizing the accuracy of the AF processing as a gain-up TV (shutter speed for increasing the gain (ISO sensitivity)) in the set P diagram for AF, without particularly considering the suppression of the flicker. For example, instead of prioritizing the fixation of the shutter speed to a specific value (for example, 1/50 second or 1/60 second) that is effective in the suppression of the flicker, a P diagram for AF for still image capturing that prevents an increase in the gain as much as possible and that opens the aperture can be used. As a result, an increase in the noise of the through images due to the gain-up can be suppressed, and the depth of field can be reduced to improve the accuracy of the AF processing (for example, contrast method) using the through images.

(S209)

The system control unit 50 moves the process to S210 if it is determined that the power frequency of the flickering light source detected in S201 is 50 Hz (under 50 Hz flickering light source) and moves the process to S211 otherwise (under 60 Hz flickering light source). If the flicker is detected when the P diagrams for AF for moving image capturing and for moving image/still image continuous capturing are used, an appropriate gain-up TV is set according to the flicker rate to obtain the flicker suppression effect.

(S210 and S211)

The system control unit 50 sets the gain-up TV of the P diagram for AF for moving image/still image continuous capturing to n/100 (n is a positive integer) second, such as 1/50 second and 1/100 second, under the flickering light source of 50 Hz power frequency. The system control unit 50 sets the gain-up TV to n/120 (n is a positive integer) second, such as 1/60 second and 1/120 second, under the flickering light source of 60 Hz power frequency. In this way, the flicker can be suppressed for different flicker rates by setting a positive multiple of the reciprocal of the flicker rate as the gain-up TV of the shutter speed.

Setting the gain-up TV of the program diagram to n/100 second denotes that the program diagram sets a combination of the aperture value and the gain coefficient that maintains the shutter speed to n/100 second even if the subject luminance is changed. As described, in the P diagram for AF for moving image/still image continuous capturing, an appropriate exposure amount is secured without increasing the gain based on the combination of the aperture as fully open as possible and the shutter speed of n/100 second. However, if the shutter speed of n/100 second cannot be maintained even if the aperture is fully open, the exposure amount is secured by fixing the shutter speed to n/100 second and increasing the ISO sensitivity by the gain-up.

In the description here, the gain-up TV of the selected P diagram for AF is changed to a value that can suppress the flicker when the flicker is detected. However, P diagrams for AF corresponding to general flicker rates may be stored in advance, and a P diagram for AF corresponding to a detected flicker rate may be selected.

<P Diagram for AF>

Specific examples of the P diagrams for AF in still image capturing, in moving image capturing, and in moving image/still image continuous capturing will be described with reference to FIGS. 3A to 3E. It is assumed here that the digital camera 100 can switch two types of apertures, a full open aperture and a partially open aperture, and the apertures correspond to Av3 and Av6, respectively. The lowest speed and the highest speed of the shutter speed correspond to Tv5 and Tv10, and the maximum gain coefficient is Gain4 in the description. The gain coefficient is a value (≥1) indicating an increase rate relative to a standard gain in the amplifier, and the lowest gain coefficient Gain0 corresponds to 0% increase rate (i.e. no gain-up). Therefore, the maximum ISO sensitivity is set when the maximum gain coefficient is set, and the minimum ISO sensitivity is set when the minimum gain coefficient is set.

FIGS. 3A to 3E show the Av value, the Tv value, and the upper and lower limits of the gain coefficient as examples of the values suitable for AF. The Av value, the Tv value, and the upper and lower limits of the gain coefficient may be different between moving image capturing and still image capturing.

FIGS. 3A to 3E show P diagrams for AF in image capturing. A solid line denotes Av (Aperture Value), a broken line denotes Tv (Time Value), and a dotted line denotes a gain coefficient. The abscissa denotes the subject luminance, and the luminance is higher to the right. The ordinate denotes the Av value, the Tv value, and the gain coefficient, and the higher the graph, the greater the value. In general, the lower the luminance, the smaller the Av value and the Tv value and the larger the gain coefficient. More specifically, the aperture is opened, the shutter speed is reduced, and the gain is increased to obtain a necessary exposure amount. Conversely, in general, the higher the luminance, the larger the Av value and the Tv value and the smaller the gain coefficient. More specifically, the aperture is closed, the shutter speed is increased, and the gain is reduced.

Figure 3A:
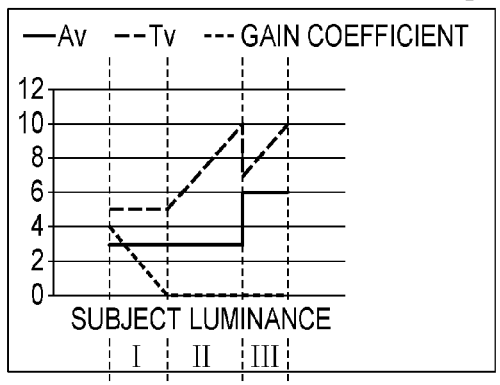
FIGS. 3A to 3E are diagrams showing examples of program diagrams for the auto-focus detection process used by the digital camera according to the embodiments of the present invention.

FIG. 3A shows a P diagram for AF in still image capturing. A sector (I) of FIG. 3A denotes control in low luminance, and there is a combination of full open aperture, lowest shutter speed, and maximum gain coefficient in the lowest luminance in an automatic exposure control range. In the sector, the gain coefficient is reduced up to the minimum value (Gain0) in priority to the other parameters with an increase in the luminance. In a sector (II) with a combination of minimum gain coefficient, full open aperture, and lowest shutter speed, the Tv value is increased while maintaining the minimum gain coefficient and the full open aperture with an increase in the luminance. In a sector (III) exceeding the luminance of a combination of minimum gain coefficient, full open aperture, and highest shutter speed, the aperture is closed by one stage (the Av value is set to the value Av6 corresponding to the partially open aperture), and the Tv value is increased again from the value corresponding to the new Av value. If the aperture can be further reduced, the same control as in the sector (III) is repeated until the aperture becomes the minimum.

As described, in the auto focus method for detecting the in-focus position based on the contrast of the image, excellent focus accuracy can be generally obtained if an image obtained based on small Av value and gain is used. This is because the smaller the Av value (the greater the aperture), the shallower the depth of field, and the difference between the focused part and the unfocused part in the image becomes clear. Therefore, the peak of the contrast of the image becomes clear if the image is captured by opening the aperture as much as possible, and the detection accuracy of the in-focus position increases. Meanwhile, since the gain is an amplification factor of the signal output from the image sensor 14, the noise component in the image largely affects the contrast of the image if the gain is large. As a result, the possibility of false determination of the peak of the contrast of the image and the peak of the noise component increases, and this causes a reduction in the focus detection accuracy. For this reason, the focus detection accuracy (image quality) is prioritized over the suppression of the flicker in the P diagram for AF in still image capturing. The shooting conditions are set so that the aperture is opened as much as possible and the gain-up is prevented as much as possible.

Figure 3B:
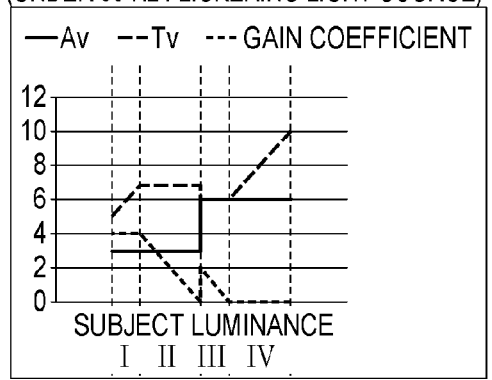

FIG. 3B shows a P diagram for AF in moving image capturing under the flickering light source of 60 Hz power frequency. As a matter of convenience, the program diagram comprises first to fourth sections (I) to (IV) that are continuous from the low luminance to the high luminance according to the subject luminance in the description.

In the sector (I) of FIG. 3B, a combination of full open aperture, lowest shutter speed, and maximum gain coefficient corresponds to the lowest subject luminance. With an increase in the subject luminance, the TV value is changed up to $1/120$ second, which is the shutter speed that can suppress the flicker caused by the light source in the imaging environment, while maintaining the full open aperture and the maximum gain coefficient. When the shutter speed becomes $1/120$ second, the gain coefficient is reduced to the minimum value in the next sector (II) (second sector) while maintaining the shutter speed of $1/120$ second and the full open aperture.

When the gain coefficient reaches the minimum value, the aperture is closed by one stage (the Av value is set to the value Av6 corresponding to the partially open aperture). At the same time, the TV value is changed to a value corresponding to $1/60$ second which is the shutter speed that can suppress the flicker, and the gain coefficient is changed to set the shutter speed to $1/60$ second. In the next sector (III), the gain coefficient is reduced while maintaining the shutter speed $1/60$ second and the partially open aperture (Av6). The Tv value is increased in the sector (IV), in which the shutter speed $1/60$ second cannot be maintained even if the gain coefficient reaches the minimum value, and the luminance is high. In the mode of recording the moving image, it is generally known to set the shutter speed to $1/60$ second or $1/120$ second under the flickering light source of 60 Hz power frequency to suppress the reduction in the image quality due to the flicker. For this reason, unlike the P diagram for AF for still image capturing of FIG. 3A, a P diagram prioritizing the use of the shutter speed that can suppress the flicker over the full open aperture and the low gain-up is set.

Figure 3C:
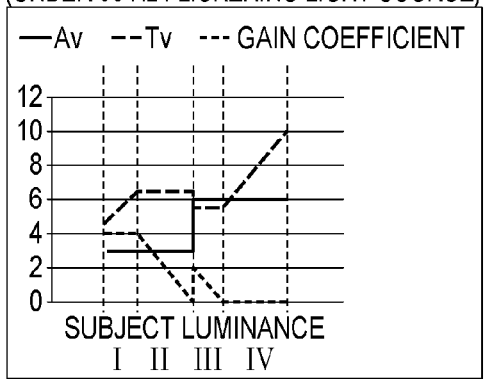

FIG. 3C shows a P diagram for AF in moving image capturing under the flickering light source of 50 Hz power frequency. Although the P diagram is similar to that of FIG. 3B, the shutter speeds of the sector (II) and the sector (III) are $1/100$ second and $1/50$ second, respectively. This is because the flicker can be suppressed by setting the shutter speed to $1/50$ second or $1/100$ second under the flickering light source of 50 Hz power frequency.

The image capturing for the auto-focus detection process and the image capturing for recording the moving image are not separately performed in the moving image capturing, and the P diagram for AF in moving image capturing is similar to the normal P diagram in moving image capturing. Therefore, the suppression of the flicker is prioritized over the accuracy of the AF processing in the P diagram for AF in moving image capturing, and the Tv value is changed to a value that cannot suppress the flicker when the subject luminance cannot be followed even if the Av value and the gain coefficient are changed to the limit values.

Figure 3D:
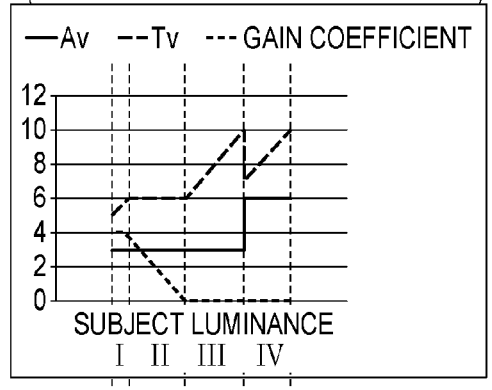

FIG. 3D shows a P diagram for AF for moving image/still image continuous capturing under the flickering light source of 60 Hz power frequency. The P diagram for AF comprises sectors (I) to (IV) for determining the combination of the aperture, the shutter speed, and the gain coefficient under the following conditions with an increase in the luminance from low luminance.

In the sector (I) with the lowest luminance, the Tv value is increased up to $1/60$ second which is the shutter speed that can suppress the flicker from the combination of full open aperture, lowest shutter speed, and maximum gain coefficient. When the shutter speed becomes $1/60$ second, the gain coefficient is reduced to the minimum value while maintaining the full open aperture and the shutter speed of $1/60$ second in the sector (II). The sectors (III) and (IV) after the gain coefficient has reached the minimum value are similar to the sectors (II) and (III) of the P diagram for AF in still image capturing shown in FIG. 3A. More specifically, the Tv value is increased while maintaining the minimum gain coefficient and the full open aperture in the sector (III) (third section) with an increase in the luminance. In the sector (IV) (fourth sector) exceeding the luminance with the combination of minimum gain coefficient, full open aperture, and highest shutter speed, the aperture is closed by one stage (the Av value is set to the value Av6 corresponding to the partially open aperture), and the Tv value is increased again from the value corresponding to the new Av value.

Figure 3E:
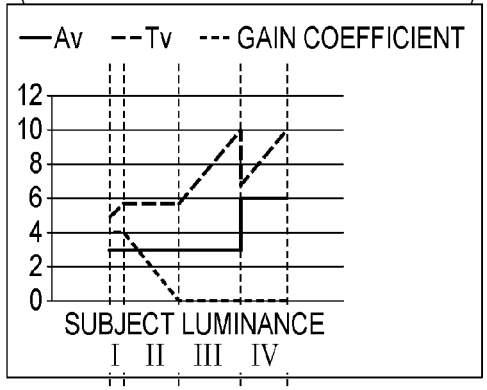

FIG. 3E shows a P diagram for AF for moving image/still image continuous capturing under the flickering light source of 50 Hz power frequency. Although the P diagram is similar to that in FIG. 3D, the shutter speed of the sector (II) is $1/50$ second. This is because the flicker can be suppressed by setting the shutter speed to $1/50$ second under the flickering light source of 50 Hz.

In the shooting mode for recording not only the still image, but also the moving image of the predetermined period just before the still image capturing, a moving image without the suppression of the flicker in the AF processing are recorded if the P diagram prioritizing the accuracy of AF processing as shown in FIG. 3A is used to execute the AF processing. This will be understood considering that the activation of the first shutter switch (SW1) 62 as a start instruction of the shooting-preparation process is generally based on the intension of the use to capture images. More specifically, the user who intends to capture images would quickly instruct the start of imaging (ON of the second shutter switch (SW2) 64) once the focus detection by the AF processing is completed. Therefore, it is likely that the recorded moving image includes images captured in the AF processing. Meanwhile, if the P diagrams prioritizing the suppression of the flicker as shown in FIGS. 3B and 3C are used, the aperture tends to be small in high luminance sectors as compared to FIG. 3A, and the range in which the gain coefficient is not the minimum value is large. This is disadvantageous in executing highly accurate AF processing. Therefore, in the present embodiment, the (initial) shutter speed that can suppress the flicker is set first as shown in FIGS. 3D and 3E, and then the gain coefficient is reduced to the minimum value. As a result, a moving image with the suppression of the flicker that cannot be realized when the P diagram for AF in still image capturing is used can be obtained in the luminance range of the sector (II). Since the full open aperture and the minimum gain coefficient are maintained in the section of the sector (III), it is likely that the AF processing with higher accuracy can be realized compared to when the P diagram for AF in moving image capturing is used.

<Flicker Detection>

An example of the flicker detection process carried out in S201 of FIG. 2 will be described with reference to flow charts of FIGS. 4A and 4B.

(S401)

The system control unit 50 first sets the gain-up Tv of the P diagram used for capturing the through images to $1/60$ second and $1/120$ second. As a result, although the flicker in the through images can be suppressed in the image capturing under the flickering light source of 60 Hz power frequency, it is difficult to suppress the flicker in the through images in image capturing under the flickering light source of 50 Hz power frequency.

(S402)

The image processing unit 20 calculates a luminance histogram Yf[i] for the current frame image of the through images, wherein i denotes the number of divisions of the luminance histogram. For example, possible luminance values of the pixels of the image are 0 to 255, and possible values of i are 0 to 31. In this case, Yf[0] is a sum of the number of pixels with luminance values of 0 to 7, Yf[1] is a sum of the number of pixels with luminance values of 8 to 15, and Yf[31] is a sum of the number of pixels with luminance values of 248 to 255.

(S403)

The system control unit 50 determines whether the image processing unit 20 has calculated the luminance histogram more than a predetermined number of times (CalcNum+1) necessary to detect the flicker. The system control unit 50 ends the process if the number of times is insufficient and waits for the next frame image to be captured. The system control unit 50 moves the process to S404 if the luminance histogram is calculated more than the predetermined number of times.

(S404)

The system control unit 50 sequentially calculates a sum of differences obtained by adding the differences between divided sections of the luminance histogram between consecutive two frame images in the luminance histogram calculated for a plurality of predetermined consecutive (CalcNum+1) frame images of the through images. For example, when n=0, the system control unit 50 calculates the sum of differences of the luminance histogram of the current frame image and the previous frame image. Assuming that the luminance histogram of the current frame image is Yf[i][0] and the luminance histogram of the previous frame image is Yf[i][1], the difference is DiffSum[0]=Σ(Yf[i][0]−Yf[i][1]) (i=0, 1, . . . , 31).

(S405)

The system control unit 50 calculates a maximum value, a minimum value, and a difference Delta between the values of DiffSum[n] acquired in S404.

(S406)

The system control unit 50 assumes that there is a possibility that the through images include a flicker component (flicker is generated) if the value of Delta is equal to or greater than Th_Min and equal to or smaller than Th_Over. The system control unit 50 assumes that the through images do not include a flicker component if the value of Delta is smaller than Th_Min and determines that there is a possibility of a false detection if the value of Delta is greater than Th_Over.

(S407 and S408)

If the system control unit 50 assumes that there is a possibility that the flicker is generated in S406, the system control unit 50 increases a flicker detection count Count by 1 and initializes the count (Count=0) otherwise. This is to suppress the false detection, because there is a possibility of a false detection of the flicker if it is assumed that the flicker is generated when the value of Delta is once within a threshold (Th_Min≤Delta≤Th_Over).

(S409 and S410)

If it is continuously assumed for a certain period that there is a possibility that a nearest (CalcNum+1) frame image includes a flicker component, the system control unit 50 determines that the image is captured under the flickering light source of 50 Hz power frequency. Specifically, if the flicker detection count is equal to or greater than Th_Count, the system control unit 50 determines that the flicker of 50 Hz power frequency is detected. The system control unit 50 changes the gain-up Tv in the P diagram for through image capturing to $1/50$ second and $1/100$ second to suppress the flicker of 50 Hz power frequency.

(S411)

The system control unit 50 applies the same processes as in S402 to S408 to the image captured using the P diagram in which the gain-up Tv is changed to $1/50$ second and $1/100$ second.

(S412, S413, and S414)

If it is continuously assumed for a certain period that there is a possibility that the nearest (ClacNum+1) frame image includes a flicker component, the system control unit 50 determines that the image is captured under the flickering light source of 60 Hz power frequency. Specifically, if the flicker detection count is equal to or greater than Th_Count, the system control unit 50 determines that the flicker of 60 Hz power frequency is detected. The system control unit 50 changes the gain-up Tv in the P diagram for through image capturing to $1/60$ second and $1/120$ second to suppress the flicker of 60 Hz power frequency. Meanwhile, if the flicker detection count is smaller than Th_Count, the system control unit 50 determines that the image is captured neither under the flickering light source of 60 Hz nor 50 Hz power frequency. In this case, the system control unit 50 puts the gain-up TV of the P diagram for through image capturing back to the value before the change. Alternatively, the system control unit 50 may make a change to use the P diagram for still image capturing.

In this way, the digital camera 100 of the present embodiment starts the auto-focus detection process when the shutter button is half-pressed and captures a still image when the shutter button is full-pressed. The digital camera 100 also has the moving image/still image continuous shooting mode for recording a moving image for a predetermined time just before the still image capturing along with the still image. In the digital camera 100, both the suppression of the flicker and the accuracy of the AF processing are taken into account in the program diagram for AF for determining the shooting conditions for capturing the images to execute the auto-focus detection process in the moving image/still image continuous shooting mode. Specifically, in a sector of low luminance in which the gain coefficient is not the minimum value, the moving image with the suppression of the flicker can be obtained by setting the shutter speed that can suppress the flicker and then reducing the gain coefficient to the minimum value. In a range with higher luminance after reaching the subject luminance in which the gain coefficient is the minimum value, a combination of the aperture and the shutter speed that prioritizes opening the aperture as much as possible is set while maintaining the minimum gain coefficient. Therefore, highly accurate AF processing can be realized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-017114, filed on Jan. 28, 2011, which is hereby incorporated by reference herein its entirety.

What is claimed is:

1. An image-capturing apparatus comprising: an image sensor; and a processing unit configured to execute a shooting-preparation process including an auto-focus detection process using image data obtained by capturing by said image sensor in response to a start instruction of the shooting-preparation process, the image-capturing apparatus having a shooting mode for recording a still image obtained by capturing by said image sensor in response to an image-capturing instruction provided after the start of the shooting-preparation process and a moving image obtained by capturing by said image sensor in a predetermined period just before the image-capturing instruction, wherein said processing unit uses a program diagram defining a combination of a shutter speed, an aperture value, and ISO sensitivity for each subject luminance to determine shooting conditions for said image sensor to capture and obtain image data used in the auto-focus detection process in the shooting-preparation process in the shooting mode, the program diagram comprises first to fourth sectors, and the shooting conditions are determined so that in the first sector, the shutter speed is increased to a predetermined shutter speed that can suppress a flicker caused by a light source in an imaging environment while maintaining a full open aperture and maximum ISO sensitivity with an increase in the subject luminance from a combination of the full open aperture, a lowest shutter speed, and the maximum ISO sensitivity, in the second sector next to the first sector, the ISO sensitivity is reduced to minimum ISO sensitivity while maintaining the full open aperture and the predetermined shutter speed with an increase in the subject luminance, in the third sector next to the second sector, the shutter speed is increased to a highest shutter speed while maintaining the full open aperture and the minimum ISO sensitivity with an increase in the subject luminance, and in the fourth sector next to the third sector, the shutter speed is increased from the shutter speed corresponding to the aperture and the minimum ISO sensitivity to the highest shutter speed while maintaining the aperture and the minimum ISO sensitivity with a reduction in the aperture and an increase in the subject luminance from a combination of the minimum ISO sensitivity, the full open aperture, and the highest shutter speed.

2. The image-capturing apparatus according to claim 1, further comprising a detection unit configured to detect whether the image capturing is under a flickering light source and detecting a flicker rate based on image data obtained by capturing by said image sensor, wherein said processing unit sets a value of the predetermined shutter speed to a positive multiple of a reciprocal of the flicker rate detected by said detection unit.

3. The image-capturing apparatus according to claim 2, wherein when said detection unit detects that the image capturing is not under the flickering light source, said processing unit uses a program diagram different from the program diagram to set the shooting conditions for said image sensor to capture the image data used in the auto-focus detection processing in the shooting-preparation process in the shooting mode, the program diagram comprising a first sector for reducing the ISO sensitivity to the minimum ISO sensitivity while maintaining the full open aperture and the lowest shutter speed with an increase in the subject luminance from the combination of the full open aperture, the lowest shutter speed, and the maximum ISO sensitivity, a second sector next to the first section for increasing the shutter speed to the highest shutter speed while maintaining the minimum ISO sensitivity and the full open aperture with an increase in the luminance, and a third sector next to the second sector for increasing the shutter speed from the shutter speed corresponding to the aperture and the minimum ISO sensitivity to the highest shutter speed while maintaining the aperture and the minimum ISO sensitivity with a reduction in the aperture and an increase in the subject luminance from the combination of the minimum ISO sensitivity, the full open aperture, and the highest shutter speed.

4. An image-capturing apparatus having a first shooting mode in which, a still image is captured in response to an image-capturing instruction, and the captured still image and a moving image of a predetermined period, which was captured before receiving the image-capturing instruction and capturing the still image, are recorded in response to a predetermined instruction, and a second shooting mode in which, a still image is captured in response to an image-capturing instruction, and the captured still image and a moving image of a predetermined period, which was captured before receiving the image-capturing instruction and capturing the still image, are not recorded in response to the predetermined instruction, wherein when a focus control is performed in response to a start instruction of a shooting-preparation process executed before receiving the image-capturing instruction in the first shooting mode, an exposure control for the focus control is performed in which a predetermined shutter speed that can suppress a flicker is prioritized, and when a focus control is performed in response to the start instruction of the shooting-preparation process executed before receiving the image-capturing instruction, an exposure control for the focus control is performed in which the first image mode is prioritized over the second shooting mode in setting the predetermined shutter speed that can suppress the flicker.

5. A control method of an image-capturing apparatus, the image-capturing apparatus comprising: an image sensor; and a processing unit configured to execute a shooting-preparation process including an auto-focus detection process using image data obtained by capturing by said image sensor in response to a start instruction of the shooting-preparation process, the image-capturing apparatus having a shooting mode for recording a still image obtained by capturing by said image sensor in response to an image-capturing instruction provided after the start of the shooting-preparation process and a moving image obtained by capturing by said image sensor in a predetermined period just before the image-capturing instruction, the method comprising a step, by said processing unit, of using a program diagram defining a combination of a shutter speed, an aperture value, and ISO sensitivity for each subject luminance to determine shooting conditions for said image sensor to capture and obtain image data used in the auto-focus detection process in the shooting-preparation process in the shooting mode, wherein the program diagram comprises first to fourth sectors, and the shooting conditions are determined so that in the first sector, the shutter speed is increased to a predetermined shutter speed that can suppress a flicker caused by a light source in an imaging environment while maintaining a full open aperture and maximum ISO sensitivity with an increase in the subject luminance from a combination of the full open aperture, a lowest shutter speed, and the maximum ISO sensitivity, in the second sector next to the first sector, the ISO sensitivity is reduced to minimum ISO sensitivity while maintaining the full open aperture and the predetermined shutter speed with an increase in the subject luminance, in the third sector next to the second sector, the shutter speed is increased to a highest shutter speed while maintaining the full open aperture and the minimum ISO sensitivity with an increase in the subject luminance, and in the fourth sector next to the third sector, the shutter speed is increased from the shutter speed corresponding to the aperture and the minimum ISO sensitivity to the highest shutter speed while maintaining the aperture and the minimum ISO sensitivity with a reduction in the aperture and an increase in the subject luminance from a combination of the minimum ISO sensitivity, the full open aperture, and the highest shutter speed.

6. An image-capturing apparatus including a first shooting mode in which, a still image is captured in response to an image-capturing instruction, and the captured still image and a moving image of a predetermined period, which was captured before receiving the image-capturing instruction and capturing the still image, are recorded in response to a predetermined instruction, and a second shooting mode in which, a still image is captured in response to an image-capturing instruction, and the captured still image and a moving image of a predetermined period, which was captured before receiving the image-capturing instruction and capturing the still image, are not recorded in response to the predetermined instruction, wherein when a focus control is performed in response to the start instruction of the shooting-preparation process executed before receiving the image-capturing instruction, an exposure control for the focus control is performed in which the first image mode is prioritized over the second shooting mode in setting the predetermined shutter speed that can suppress the flicker.

7. A control method of an image-capturing apparatus including a first shooting mode in which, a still image is captured in response to an image-capturing instruction, and the captured still image and a moving image of a predetermined period, which was captured before receiving the image-capturing instruction and capturing the still image, are recorded in response to a predetermined instruction, and a second shooting mode in which, a still image is captured in response to an image-capturing instruction, and the captured still image and a moving image of a predetermined period, which was captured before receiving the image-capturing instruction and capturing the still image, are not recorded in response to the predetermined instruction, wherein when a focus control is performed in response to the start instruction of the shooting-preparation process executed before receiving the image-capturing instruction, an exposure control for the focus control is performed in which the first image mode is prioritized over the second shooting mode in setting the predetermined shutter speed that can suppress the flicker.

* * * * *